(12) United States Patent
Glickman et al.

(10) Patent No.: US 10,717,471 B2
(45) Date of Patent: Jul. 21, 2020

(54) VEHICLE WITH VERTICAL LIFT HOOD

(71) Applicant: FORD GLOBAL TECHNOLOGIES, LLC, Dearborn, MI (US)

(72) Inventors: David Brian Glickman, Southfield, MI (US); Stuart C. Salter, White Lake, MI (US); Paul Kenneth Dellock, Northville, MI (US); Mark A. Wisneski, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 82 days.

(21) Appl. No.: 16/173,154

(22) Filed: Oct. 29, 2018

(65) Prior Publication Data

US 2020/0130750 A1 Apr. 30, 2020

(51) Int. Cl.
*B62D 25/12* (2006.01)
*E05C 17/30* (2006.01)
*B60Q 3/30* (2017.01)

(52) U.S. Cl.
CPC .............. *B62D 25/12* (2013.01); *B60Q 3/30* (2017.02); *E05C 17/30* (2013.01); *E05Y 2900/536* (2013.01); *E05Y 2900/548* (2013.01)

(58) Field of Classification Search
CPC ................ B60R 5/02; E05Y 2900/548; E05Y 2900/546; B62D 25/082; B62D 25/087; B62D 25/08
USPC .................................................... 296/193.11
See application file for complete search history.

(56) References Cited

U.S. PATENT DOCUMENTS

| | | | | |
|---|---|---|---|---|
| 7,571,955 B2 * | 8/2009 | Nagae | ................. | B60R 21/0136 296/187.09 |
| 7,836,996 B2 * | 11/2010 | Kitte | ....................... | B60R 21/36 180/271 |
| 8,388,047 B2 * | 3/2013 | Schmidt | ............... | B62D 25/087 296/193.09 |
| 8,764,079 B1 * | 7/2014 | Kim | ....................... | B60R 19/52 293/115 |
| 8,777,299 B2 * | 7/2014 | Langford, Jr. | ......... | B62D 25/10 180/69.2 |
| 10,173,739 B2 * | 1/2019 | Bellis | ........................ | B60R 5/04 |
| 10,195,999 B1 * | 2/2019 | Glickman | .................. | B60R 5/02 |
| 2006/0290172 A1 * | 12/2006 | Hirata | ..................... | B60R 21/38 296/187.04 |

(Continued)

FOREIGN PATENT DOCUMENTS

CN 107299806 A 10/2017
CN 206942457 U 1/2018
(Continued)

OTHER PUBLICATIONS http://www.clubroadster.net/vb_forum/86-diy-how-writeups/115538-miata-vertical-hood-mod-pictures.html.

*Primary Examiner* — Pinel E Romain
(74) *Attorney, Agent, or Firm* — David Coppiellie; McMillan, Sobanski & Todd, LLC

(57) ABSTRACT

A vehicle having a front trunk and a method of controlling a vehicle to access the trunk may include raising a hood from a closed position adjacent body structure to a fully open position with the hood oriented horizontally to provide access to a front trunk, raising a grille with the hood; and pivoting the grille about a hinge affixed to the hood. Front trunk lighting and bins maybe included in the vehicle.

15 Claims, 3 Drawing Sheets

(56) References Cited

U.S. PATENT DOCUMENTS

2011/0031771 A1* 2/2011 Ding .................... B60R 5/02
296/24.4
2013/0155709 A1 6/2013 Kim et al.

FOREIGN PATENT DOCUMENTS

CN 107650864 A 2/2018
EP 0908373 A1 4/1999

* cited by examiner

VEHICLE WITH VERTICAL LIFT HOOD

BACKGROUND OF THE INVENTION

The present invention relates to a vehicle having a front trunk and more particularly to user access to the trunk.

Some vehicles include a front trunk, which may be due to the engine being located other than under a hood at the front of the vehicle, or due to the vehicle operating as a battery electric, in which case there is no engine under the hood.

In particular vehicle models, there may be customer options for an engine-based powertrain (gasoline, diesel, etc.), a hybrid electric powertrain or a pure battery electric powertrain. Due to cost efficiency, esthetics and functionality, the overall shape of the vehicle front end and structure may be maintained for all of the various powertrain options. For such vehicles, a hood and engine compartment is needed to receive and support the engine for the engine driven configuration of the vehicle. However, for the battery electric powertrain, then, the area where the engine is typically located may act as a front trunk for storage since no engine is present. Ease of access to this front trunk area is desirable.

SUMMARY OF THE INVENTION

An embodiment contemplates method of controlling a vehicle comprising: raising a hood from a closed position adjacent body structure to a fully open position with the hood oriented horizontally to provide access to a front trunk, raising a grille with the hood, and pivoting the grille about a hinge affixed to the hood.

An embodiment contemplates a vehicle having body structure including a front trunk, a hood above the front trunk, a lift assembly including struts mounted between the hood and body structure configured to lift the hood from a closed position to a fully open position with the hood oriented horizontally, and a grille pivotally mounted to the trunk.

An advantage of an embodiment is that essentially the same vehicle structure and front end look may be employed for various drivetrain configurations of a vehicle, while providing ease of access to a front trunk for a battery electric powertrain configuration of the vehicle. The ease of access to the front trunk is provided while providing features that add to the functionality of the front trunk, such as lighting and storage organizers.

DETAILED DESCRIPTION

Figure 1:
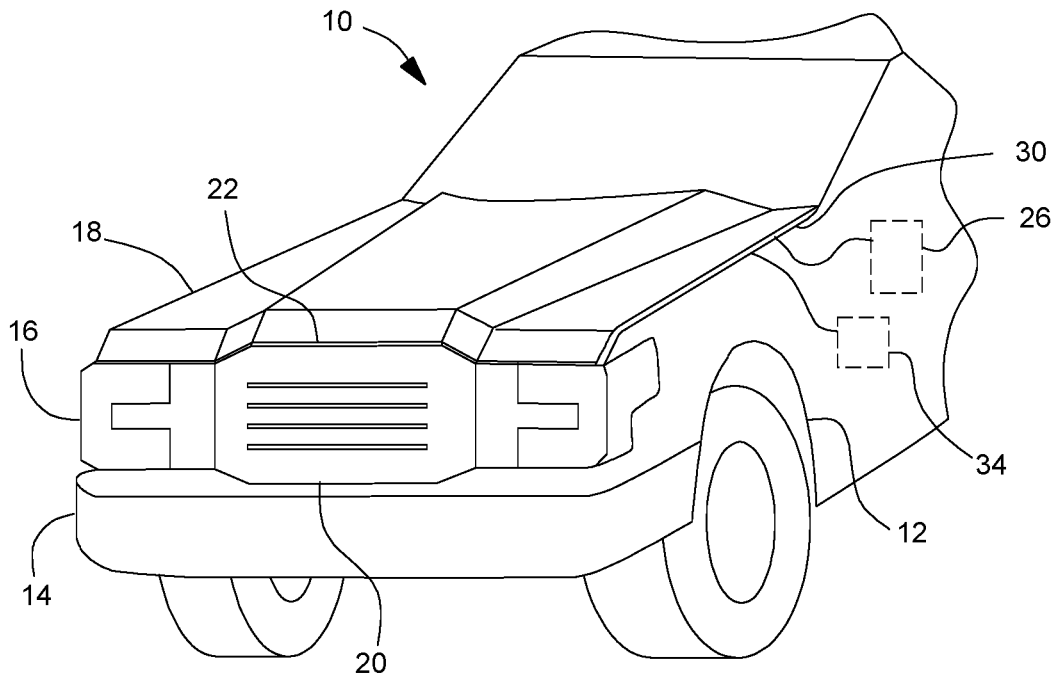
FIG. 1 is a schematic perspective view of a front end of a vehicle showing a hood in a closed position.
Figure 2:
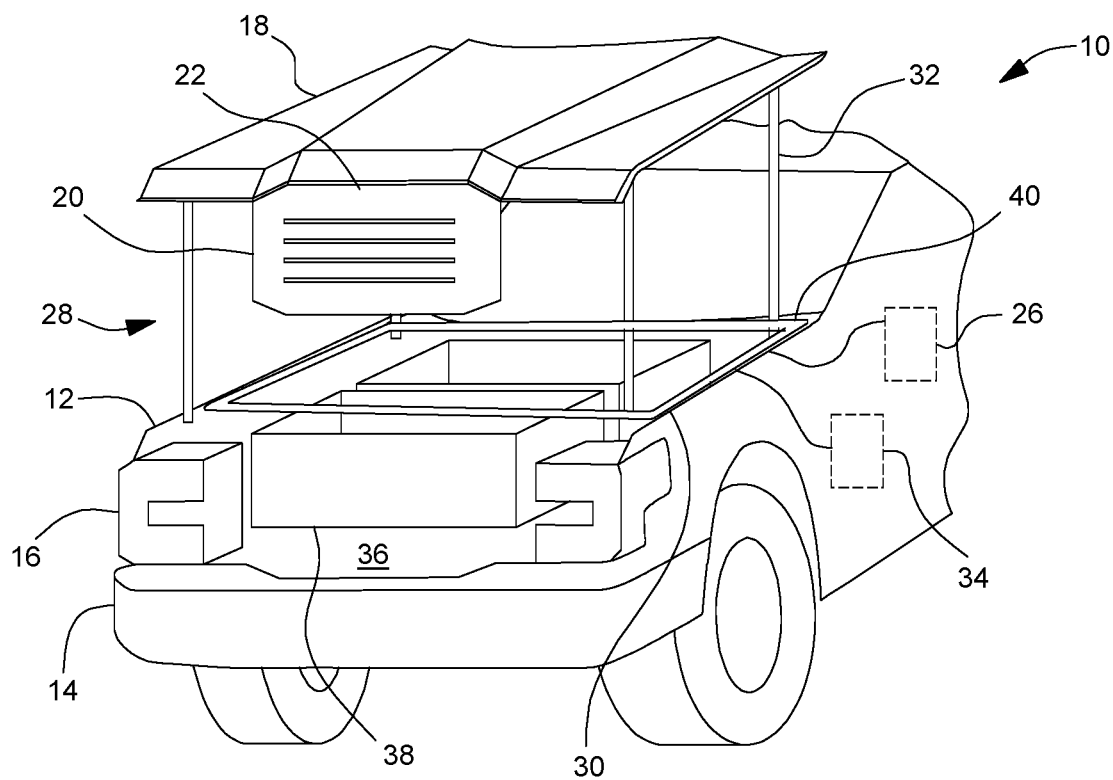
FIG. 2 is a schematic perspective view of the front end of the vehicle showing the hood in an open position.
Figure 3:
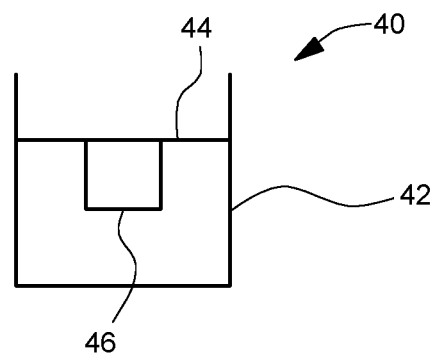
FIG. 3 is a schematic view of an underhood light assembly.
Figure 4:
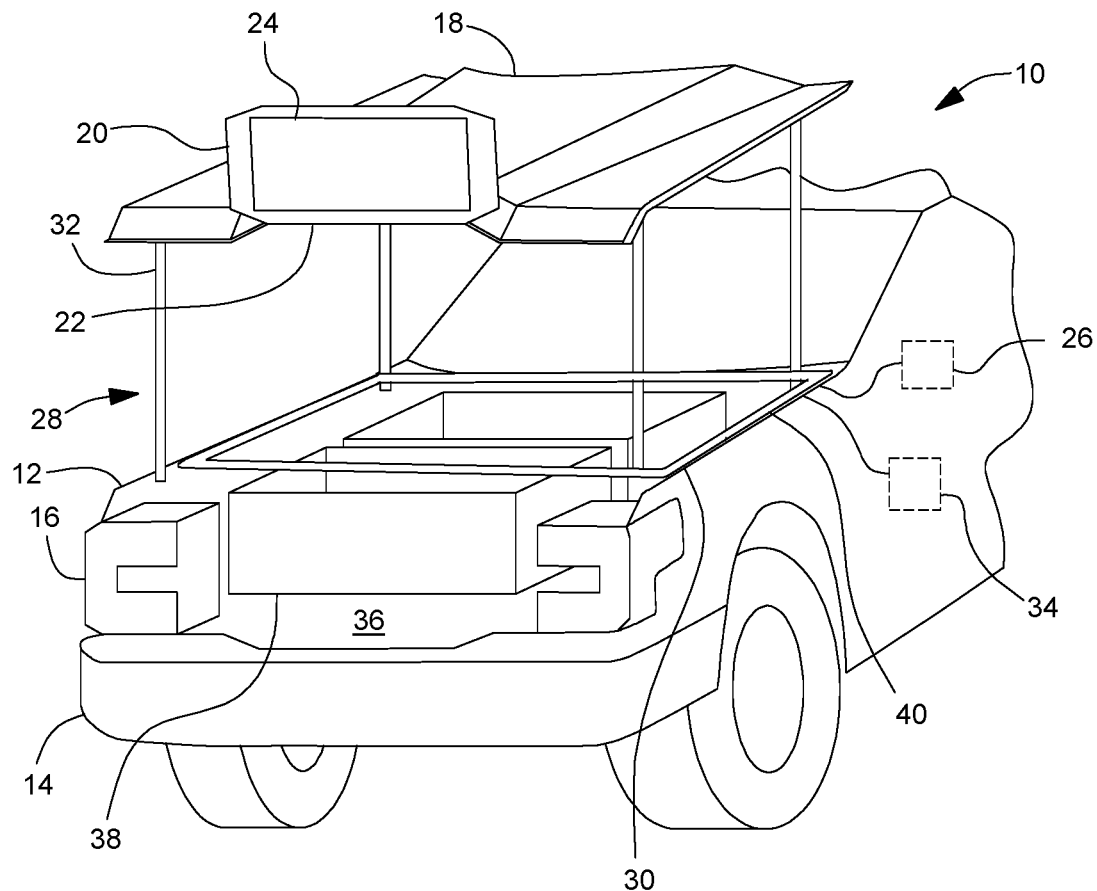
FIG. 4 is a view similar to FIG. 2, with the grille pivoted upward to expose a video display.

FIGS. 1-4 illustrate a vehicle 10 having front fenders 12, a front bumper 14, headlights 16, a hood 18 and a grille 20. The vehicle 10 may be a pickup truck, although it may be a different type of vehicle if so desired. The hood 18 is configured to be oriented in a generally horizontal position in both the closed position (FIG. 1) and in the fully open position (FIGS. 2 and 4).

The grille 20 may be sized and shaped to match a grille in an engine driven model of this vehicle in order to maintain the same look and allow for essentially the same front end vehicle body structure for both models. While the grille 20 may be configured to look the same as other models from outside of the vehicle 10, it may have a solid inner surface in order to keep water out of a front trunk 36 and provide other functionality. The solid inner surface may be feasible in this battery electric vehicle 10, rather than having perforations or openings, since no air flow is needed for engine cooling.

The grille 20 may be pivotally mounted to the hood 18 via a hinge 22, having a grille closed position (FIGS. 1 and 2) and a grille open position (FIG. 4). A video display 24 may be mounted to the inner surface of the grille 20, being protected from the elements when the grille 20 is in a closed position and positioned for viewing by people in front of the vehicle when the grille 20 is in the open position. The video display 24 may be in communication with a controller 26, which is capable of controlling the video display 24. The controller 26 may be a separate controller or may be incorporated into another vehicle controller, such as for example a vehicle body controller, if so desired.

The controller 26 may also be in communication with a hood lift assembly 28. The hood lift assembly 28 is configured to raise and lower the hood 18 between a closed position (FIG. 1), where the hood 18 is oriented horizontally and in contact with body structure 30 generally flush with the front fenders 12, and an open position (FIGS. 2 and 4), where the hood 18 is still oriented horizontally but raised above the body structure 30.

The hood lift assembly 28 includes four telescoping struts 32, mounted between body structure 30 and the hood 18. The struts 32 may be generally located at the four corners of the hood 18. The struts 32 may be hydraulically controlled by a lift actuator 34 that is in communication with the controller 26, with changes in hydraulic pressure from a pump and regulator through hydraulic lines employed to raise and lower the hood 18, or the struts 32 may be mechanically controlled by the lift actuator 34 that is in communication with the controller, with screws jacks rotated by an actuator to raise and lower the hood 18. Since hydraulic systems and screws systems for telescoping shafts are known to those skilled in the art, the details of these systems will not be discussed further herein. Either way, the controls for the four telescoping struts 32 assure that the struts 32 provide even travel at all four corners of the hood 18 in order to assure the raising of the horizontal hood 18 from its closed to open position.

Under the hood 18 is a front trunk 36, with the hood 18 in the closed position protecting the front trunk 36 from the elements and in the open position providing easy access to items in the front trunk 36.

The front trunk 36 may also include convenience features such as bins 38 that are securable in and removable from the trunk 36 and a lighting system 40.

The lighting system 40 may, for example, include an acrylic shell 42 that extends around the perimeter, with a printed circuit board (PCB) 44 and light emitting diodes (LEDs) 46 mounted within the shell 42. The lighting system 40 may be controlled by the controller 26 and actuated in coordination with the hood position.

The opening/closing of the hood 18 (an activation/deactivation of the lighting system 40) may be instigated by a keypad or touch screen on the exterior of the vehicle 10, a key fob, vehicle interior button or touch screen, remote cellular device such as a phone, etc. When closed (FIG. 1), upon a user request to open the hood 18, the controller 26 activates the lift actuator 34, which causes the hood lift assembly 28 to telescopically extend the struts 32 upward. As the struts 32 extend, the four corners of the hood 18 are raised simultaneously, thus lifting the hood 18 while maintaining the hood 18 in the horizontal position. In the fully open position (FIGS. 2 and 4), the hood 18 remains oriented in the horizontal position.

Additionally, during or after opening of the hood 18, the grille 20 may be pivoted about the hinge 22, thus both increasing ease of access to the front trunk 36 and tilting the video display 24 for ease of viewing.

Further, during opening of the hood 18, the lighting system 40 may be activated to provide light to the front trunk 36. The lighting system 40 may be a simple on/off system or may provide varying intensities of lighting based on vehicle and user conditions, if so desired. For example, the intensity of the lighting may be proportional to the distance the hood 18 is from the tops of the front fenders 12, with for example 100% intensity at full open hood and about 20% intensity when the hood 18 is only slightly open. As another example, vehicle proximity sensors near the front of the vehicle 10 may be employed to detect when a person is close to or reaching into the front trunk 36, increasing light intensity to 100% and then reducing light intensity after a predetermined time has passed without detecting a person in close proximity to the front trunk 36.

Figure 5:
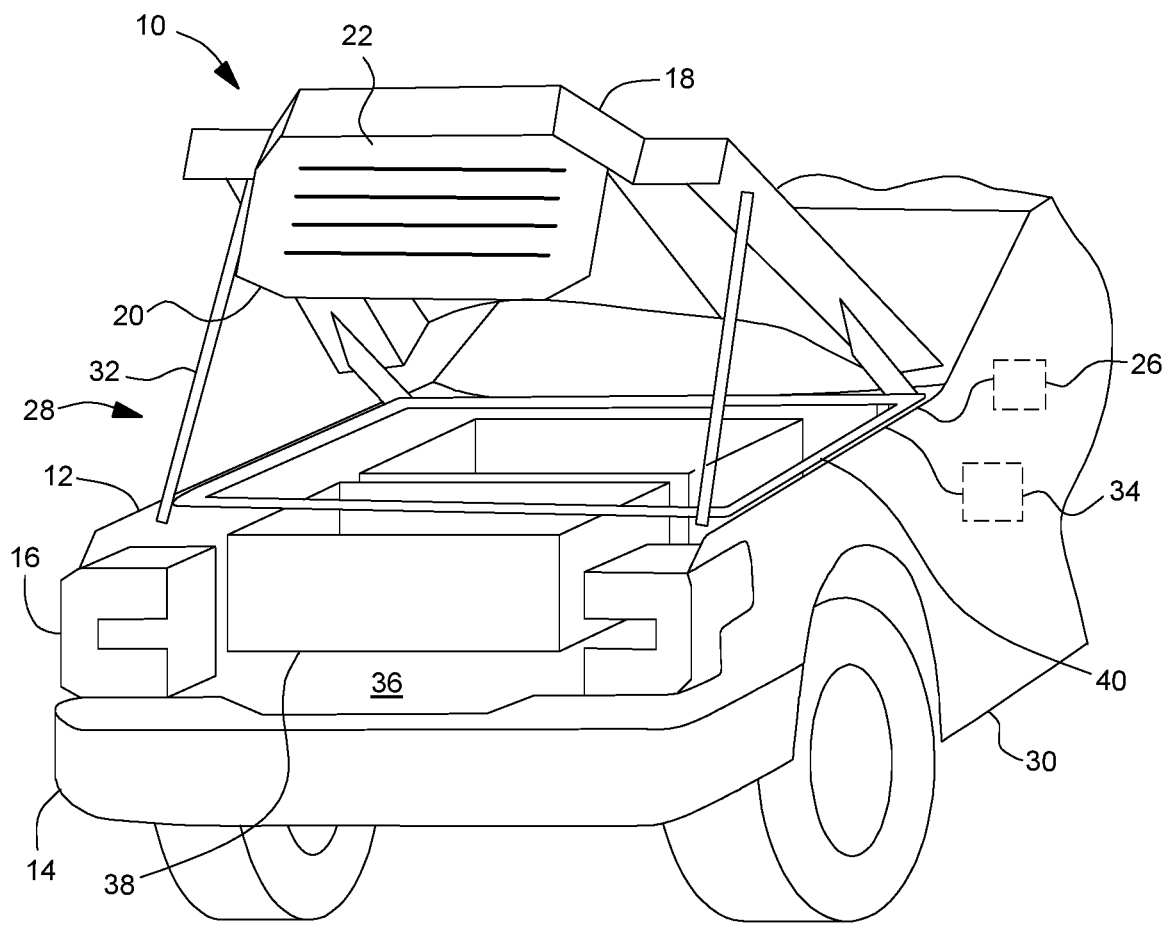
FIG. 5 is a schematic perspective view of an alternate embodiment of the hood lift assembly.
Figure 6A:
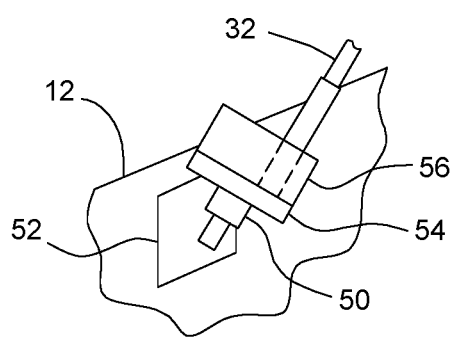
FIG. 6a is a schematic view of a hood front lift actuator.
Figure 6B:
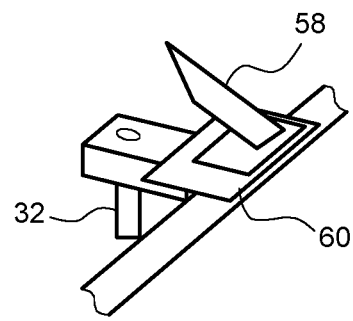
FIG. 6b is a schematic view of a hood rear lift actuator.

FIGS. 5, 6a and 6b (in combination with FIGS. 1-4) illustrate an alternate embodiment. Since many of the elements are the same as the first embodiment, similar elements will be identified by the same number and repeated detailed discussion will be omitted.

This embodiment may still include the lighting system 40, bins 38, and grille 20 that pivots about a hinge 22 to provide viewing of a video display (see FIG. 4). The controller 26 monitors and controls the lift actuator 34 of the hood lift assembly 28.

In this embodiment, the difference is in the way in which the hood 18 is lifted. The closed position, of course, looks like that in FIG. 1. The hood lift assembly 28 is changed to allow for an intermediate open position with the hood tilted (see FIG. 5) before being lifted to the fully open position (see FIGS. 2 and 4).

Accordingly, the front two struts 32 of the hood lift assembly 28 may have a ball stud 50 mounted to a fender mounting plate 52 on the corresponding front fenders 12, with an actuator mounting plate 54 on the ball stud 50 supporting an actuator 56 that telescopes the respective strut 32. The two rear struts 32 of the hood lift assembly 28 may have hood hinges 58, which may be conventional, mounted on corresponding plates 60, which mount to corresponding actuators and struts 32, which again can telescopically raise the hood 18.

This configuration allows for different types of hood opening. When the hood 18 is closed, it may be raised in a similar manner to that of FIGS. 1-4, with the hood 18 remaining horizontally oriented. Or, when the hood 18 is closed (FIG. 1), one may initiate opening where just the front struts 32 initially telescope upward, thus causing the rear of the hood 18 to pivot about the hood hinges 58 to a partially open position (FIG. 5). This partial opening may be sufficient for the person to insert/remove items from the front trunk 36. If desired, though, one may request further opening of the hood 18 from the partial open position (FIG. 5) to the fully open position (FIGS. 2 and 4), in which case the rear struts 32 telescope upward until the hood is in its fully open (horizontal) position.

While certain embodiments of the present invention have been described in detail, those familiar with the art to which this invention relates will recognize various alternative designs and embodiments for practicing the invention as defined by the following claims.

The invention claimed is:

1. A method of controlling a vehicle comprising:
raising a hood from a closed position adjacent body structure to a fully open position with the hood oriented horizontally to provide access to a front trunk;
raising a grille with the hood; and
pivoting the grille about a hinge affixed to the hood.

2. The method of claim 1 further including:
activating a video display mounted on an inner surface of the grille after pivoting the grille about the hinge.

3. The method of claim 1 further including:
activating lighting in the front trunk as the hood is raised from the closed position to the fully open position.

4. The method of claim 3 wherein the lighting is illuminated at 100% intensity when the hood is fully open and at lesser intensity as the hood is located closer to the body structure.

5. The method of claim 1 wherein the hood remains in the horizontal orientation from the closed position to the fully open position.

6. The method of claim 1 wherein the hood moves from the closed position to a partially open position where a front of the hood is raised above a back of the hood, and then the back of the hood is raised to orient the hood horizontally in the fully open position.

7. The method of claim 6 further including:
activating a video display mounted on an inner surface of the grille after pivoting the grille about the hinge.

8. The method of claim 6 further including:
activating lighting in the front trunk as the hood is raised from the closed position to the fully open position.

9. A vehicle comprising:
body structure including a front trunk;
a hood above the front trunk;
a lift assembly including struts mounted between the hood and body structure configured to lift the hood from a closed position to a fully open position with the hood oriented horizontally; and
a grille pivotally mounted to the trunk.

10. The vehicle of claim 9 including a video display mounted to an inner surface of the grille.

11. The vehicle of claim 9 a lighting system mounted under the hood and configured to light the front trunk when the hood is not in the closed position.

12. The vehicle of claim 9 wherein the lift assembly includes hood pivot hinges mounted to a rear end of the hood, between the hood and corresponding ones of the struts.

13. The vehicle of claim 12 wherein the lift assembly is configured to lift a front end of the hood from the closed position, pivoting about the hood pivot hinges, and then lift the rear end of the hood to the fully open position.

14. The vehicle of claim 9 wherein the lift assembly is configured to maintain the hood oriented horizontally from the closed position to the fully open position.

15. The vehicle of claim 9 including bins removably mounted in the front trunk.

\* \* \* \* \*